US006765080B2

United States Patent
Super et al.

(10) Patent No.: US 6,765,080 B2
(45) Date of Patent: Jul. 20, 2004

(54) HIGH PERFORMANCE RIM ELASTOMERS AND A PROCESS FOR THEIR PRODUCTION

(75) Inventors: Michael S. Super, Oakdale, PA (US); David D. Steppan, Gibsonia, PA (US); William E. Slack, Moundsville, WV (US); Bruce H. Potts, Beaver, PA (US); Michael F. Hurley, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 81 days.

(21) Appl. No.: 10/165,297

(22) Filed: Jun. 6, 2002

(65) Prior Publication Data

US 2003/0229195 A1 Dec. 11, 2003

(51) Int. Cl.⁷ .................. C08G 18/78; C08G 18/76; C08G 18/48; C08G 18/10; C08L 75/08
(52) U.S. Cl. .................. 528/60; 264/328.1; 264/328.6; 528/61; 528/64; 528/67; 528/76; 528/77
(58) Field of Search .................. 264/328.1, 328.6; 528/60, 61, 64, 67, 76, 77

(56) References Cited

U.S. PATENT DOCUMENTS

| | | | |
|---|---|---|---|
| 4,218,543 A | 8/1980 | Weber et al. | 521/51 |
| 4,546,114 A | 10/1985 | Alberino et al. | 521/51 |
| 4,631,298 A | 12/1986 | Presswood | 521/163 |
| 4,642,320 A | 2/1987 | Turner et al. | 521/176 |
| 4,764,543 A | 8/1988 | Savina | 521/160 |
| 4,774,264 A | 9/1988 | Weber et al. | 521/51 |
| 5,135,962 A | 8/1992 | Lau et al. | 521/163 |
| 5,260,346 A | 11/1993 | Cassidy et al. | 521/159 |
| 5,319,053 A | 6/1994 | Slack et al. | 528/48 |
| 5,319,054 A | 6/1994 | Slack et al. | 528/48 |
| 5,382,646 A | 1/1995 | Narayan et al. | 528/60 |
| 5,440,003 A | 8/1995 | Slack | 528/48 |
| 5,502,147 A | 3/1996 | Nodelman et al. | 528/49 |
| 5,502,150 A | 3/1996 | Nodelman et al. | 528/60 |
| 5,504,179 A | 4/1996 | Meiners et al. | 528/49 |
| 5,525,681 A | 6/1996 | Barron et al. | 525/403 |
| 5,567,793 A | 10/1996 | Slack et al. | 528/69 |
| 5,663,272 A | 9/1997 | Slack et al. | 528/69 |
| 5,686,042 A | 11/1997 | Slack et al. | 264/328.6 |
| 5,821,275 A | 10/1998 | Madan et al. | 521/159 |
| 5,874,485 A | 2/1999 | Milliren et al. | 521/160 |
| 6,271,297 B1 | 8/2001 | Ishida | 521/159 |

FOREIGN PATENT DOCUMENTS

| | | |
|---|---|---|
| CA | 2095677 | 8/1999 |
| EP | 0 641 812 | 3/1995 |
| WO | 99/07760 | 2/1999 |

*Primary Examiner*—Rabon Sergent
(74) *Attorney, Agent, or Firm*—Joseph C. Gil; N. Denise Brown

(57) ABSTRACT

This invention relates to high performance RIM (reaction injection molded) poly(urethane)urea elastomers, and to a process for their production. These elastomers comprise the reaction product of an allophanate-modified diphenylmethane diisocyanate prepolymer having an NCO group content of about 5 to about 30%, with an isocyanate-reactive component comprising a high molecular weight amine-terminated polyether polyol, an aromatic diamine chain extender, and, optionally, a chain extender or crosslinker selected from the group consisting of aliphatic amine terminated polyether polyols and aliphatic hydroxyl terminated polyether polyols, optionally, in the presence of an internal mold release agent, a surfactant and a filler.

26 Claims, No Drawings

US 6,765,080 B2

HIGH PERFORMANCE RIM ELASTOMERS AND A PROCESS FOR THEIR PRODUCTION

BACKGROUND OF THE INVENTION

This invention relates to high performance RIM elastomers, and to a process for the production of these. These elastomers comprise the reaction product of an allophanate-modified diphenylmethane diisocyanate prepolymers having an NCO group content of about 5 to about 30% by weight, with an isocyanate-reactive component comprising a high molecular weight amine-terminated polyether polyol, an aromatic diamine chain extender, and, optionally, a chain extender or crosslinker selected from the group consisting of aliphatic amine-terminated polyether polyols and aliphatic hydroxyl-terminated polyether polyols, optionally in the presence of an internal mold release agent, a surfactant, a filler and/or water.

The production of polyurethane moldings via the reaction injection molding (i.e. RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are typically used in a commercial RIM process are the aromatic isocyanates such as, for example, diphenyl methane-4,4'-diisocyanate (i.e.MDI).

U.S. Pat. No. 4,642,320 discloses a process for the preparation of a molded polymer comprising reacting inside a closed mold a reaction mixture comprising (a) an active hydrogen containing material comprising a primary or secondary amine terminated polyether having an average equivalent weight of at least 500 and having at least 25% of active H atoms as amine atoms, (b) at least one chain extender, and (c) a (cyclo)aliphatic polyisocyanate, polyisothiocyanate, or mixture thereof, wherein the NCX index is from about 0.6 to 1.5. All of the examples disclose a system based on a HDI prepolymer with amine terminated polyethers and diethyltoluenediamine at high mold temperatures and long demold times.

U.S. Pat. No. 4,764,543 discloses aliphatic RIM systems that use very fast reacting aliphatic polyamines. This patent is restricted to total polyurea systems based on chain extenders which are cycloaliphatic diamines and polyethers which are amine-terminated polyethers, with an aliphatically bound polyisocyanate.

U.S. Pat. No. 5,260,346 also discloses reaction systems for preparing elastomers via the RIM process. These systems require an allophanate modified polyisocyanate, a hydroxyl group containing polyol, and an aromatic polyamine having at least one of the positions ortho to the amine substituted with a lower alkyl substituent.

U.S. Pat. Nos. 5,502,147 and 5,502,150, which are commonly assigned, describes (cyclo)aliphatic isocyanate based RIM systems. These (cyclo)aliphatic isocyanates have a viscosity of less than 20,000 mPa·s at 25° C., an NCO functionality of 2.3 to 4.0, and are modified by isocyanurate groups, biuret groups, urethane groups, allophanate groups, carbodiimide groups, oxadiazine-trione groups, uretdione groups, and blends thereof, or prepolymers thereof. All of the working examples of these patents are based on hexamethylene diisocyanate which is modified by one of the above groups.

U.S. Pat. No. 4,546,114 discloses high flexural modulus elastomers containing polyurea linkages which are prepared by reaction injection molding, at temperatures of about 90 to about 220° C. (preferably 110 to 190° C.), reaction mixtures comprising an organic polyisocyanate, an organic compound having at least two active hydrogen atoms and a MW of about 1,500 to about 12,000, and an aromatic diamine chain extender wherein at least one of the ortho positions to an amine group is substituted by a lower alkyl group. Suitable polyisocyanates include those aromatic polyisocyanates such as isocyanate-terminated prepolymers of MDI, liquefied MDI, and mixtures thereof. Amine-terminated polyethers having a MW of 1,500 to 12,000 and amine functionalities of 2 to 4 are disclosed, and the diamine chain extenders including DETDA.

RIM molded elastomers made by reacting (a) a di- or polyisocyanate having aromatically bound NCO groups; (b) a polyether having at least 2 NCO-reactive groups and a MW of 1,800 to 12,000 in which at least 50% of the NCO-reactive groups are aromatically bound primary and/or secondary amino groups, and (c) a diamine having a MW of 108 to 400 and containing primary and/or secondary amino groups are also disclosed by U.S. Pat. No. 4,774,264. Allophanate-modified MDI prepolymers are not expressly disclosed as suitable isocyanates.

Polyurethanes formed by a RIM process are disclosed in U.S. Pat. No. 4,631,298. These polyurethanes comprise (a) an organic active hydrogen group containing compound, (b) an organic polyisocyanate, and (c) a chain extender mixture comprising two aromatic diamines having specified gel times. The resultant polyurethanes are described as having a non-brittle, rigid green strength after reaction and a flexural modulus of at least about 50,000 psi at 75° C. Suitable polyisocyanates disclosed therein include allophanate-modified isocyanates and prepolymers thereof. The high molecular weight polyether polyol of the '298 patent is not necessarily an amine-terminated polyether.

U.S. Pat. No. 5,382,646 describes compositions suitable for the preparation of RIM molded polyurethane(urea) parts. These comprise a) an isocyanate component (i.e. a prepolymer), b) a polyether polyol, c) a urethane-promoting catalyst, and d) a hindered diamine chain extender (i.e. DETDA). Isocyanate-terminated prepolymers and some modified isocyanates are disclosed as suitable isocyanate components. Allophanate-modified isocyanates and prepolymers thereof are not expressly disclosed.

Polyurea polymers prepared by reacting a polyisocyanate, a polyepoxide and a polyamine, and heating at a temperature of >150° C. are disclosed by U.S. Pat. No. 5,525,681. Suitable polyamines have a wide range of molecular weights and include, for example, alkylene polyamines, aromatic polyamines (including DETDA), amines derived from polyoxypropylene diols or triols, and mixtures thereof. Suitable polyisocyanates include prepolymers, and allophanate-modified isocyanates, but not allophanate-modified MDI prepolymers.

CA 2,095,677 discloses a process for preparing resilient elastomers containing bonded urethane or urea groups. This process comprises reacting a) a polyisocyanate component, b) a relatively high MW compound containing at least two isocyanate-reactive hydrogen atoms, c) a oxyalkylated polyoxyalkylene polyamine, and d) low MW chain extenders and/or crosslinkers (includes alkyl-substituted aromatic diamines), in the presence or absence of catalysts and additives. These oxyalkylene polyalkylene polyamines N-perethoxylated. Suitable polyisocyanates may contain allophanate groups and/or be a prepolymer.

A process for the production of a RIM molded polyurea elastomer is described in U.S. Pat. No. 5,135,962. Suitable isocyanates include prepolymers, but allophanate-modified isocyanates and prepolymers thereof are not expressly disclosed. The NCO-reactive components consist essentially of (II) a polyether having at least 2 NCO-reactive groups, a MW of 1,800 to 12,000 in which at least 50% of the NCO-reactive groups are primary and/or secondary amino groups, (III) a sterically hindered aromatic diamine chain extender, (IV) a zinc carboxylate containing 10 to 14 carbon atoms per carboxylate group.

U.S. Pat. No. 5,504,179 discloses a RIM process for the manufacture of molded parts. The reaction mixture comprises an isocyanate-terminated prepolymer, an aromatic diamine, an aliphatic reactive component having OH or NH functionality and a MW of 230 to 12,000, and inorganic fillers. Allophanate-modified diphenylmethane diisocyanate prepolymers are not disclosed by this patent.

Allophanate-modified diphenylmethane diisocyanates and prepolymers thereof are known and described in, for example, U.S. Pat. Nos. 5,319,053, 5,319,054, 5,440,003, 5,663,272 and 5,686,042.

U.S. Pat. No. 5,319,053 discloses a process for preparing stable liquid allophanate-modified MDI isocyanates and prepolymers of these allophanate-modified MDI isocyanates. This process comprises reacting a specific MDI isomer composition with an aliphatic alcohol containing between 1 and 36 carbon atoms to give an allophanate-modified MDI having an NCO group content of 12 to 32.5%.

U.S. Pat. No. 5,319,054 describes a process for producing diallophanate-modified MDI by reacting the diurethane which is the reaction product of one equivalent of a diisocyanate with one equivalent of an aliphatic alcohol or an aromatic alcohol, with 4,4'-MDI containing about 2 to about 60% by weight of the 2,4-isomer of MDI. These diallophanates have NCO group contents of about 12 to about 30%. EP 641,812 discloses the use of allophanate-modified MDI prepolymers in automotive RIM and rigid foam applications. It is a distinct feature of the invention that the flex modulus of the RIM products can be increased without modifying the chain extender composition or content.

Stable, liquid, diallophanate-modified diphenylmethane diisocyanate is known and described in, for example, U.S. Pat. No. 5,686,042. These diallophanate-modified diisocyanates are prepared from the diurethane of an alcohol and a diisocyanate and MDI. The diallophanate or a prepolymer thereof are disclosed as being used in a RIM process to produce elastomers with improved flex modulus. Since these diallophanates form elastomers with improved flex modulus, lower levels of fast reacting chain extenders are required to reach a given stiffness.

Urethane-free, allophanate-modified diphenylmethane diisocyanates are known and disclosed in, for example, U.S. Pat. No. 5,567,793. This reference also discloses the use of urethane-free, allophanate-modified isocyanates in RIM processes to improve the flex modulus of the resultant elastomers.

U.S. Pat. No. 5,663,272 discloses allophanate-modified MDI prepolymers and their use in RIM processes to improve the flex modulus of the resultant elastomers. These allophanate modified MDI's are made from a monoisocyanate with an organic compound having at least two OH groups to form a urethane, and then converting the urethane to allophanate by reacting with an isomeric mixture of MDI.

Allophanate-modified MDI's, various prepolymers thereof and other modifications thereof, can in used in various end use applications such as, for example, footwear and flexible foams, as is known and described in, for example, U.S. Pat. Nos. 5,663,272, 5,821,275 5,874,485 and 6,271,279.

The present invention, based on a system having lower DETDA levels, has a number of advantages. One advantage is that the reactivity of the system is slowed by removing some of the fast reacting diamine. This makes for better processing and adds the ability to make larger parts than with a higher DETDA level, faster reacting system. A second advantage of lowering DETDA levels is that a cost reduction of the resulting system can be achieved. DETDA is a high priced amine. Thus, lowering the DETDA level lowers the price of the resulting system.

SUMMARY OF THE INVENTION

This invention relates to high performance reaction injection molded (RIM) poly(urethane)urea elastomers. These elastomers comprise the reaction product of:

(A) an allophanate-modified diphenylmethane diisocyanate prepolymer having an NCO group content of about 5 to about 30% by weight and which comprises the reaction product of:
  (1) an allophanate-modified diphenylmethane diisocyanate having an NCO group content of about 12 to about 32.5% by weight and comprising the reaction product of
    (a) an aliphatic alcohol or an aromatic alcohol; and
    (b) diphenylmethane diisocyanate comprising:
      (i) from about 0 to about 60% by weight of 2,4'-diphenylmethane diisocyanate;
      (ii) less than about 6% by weight of 2,2'-diphenylmethane diisocyanate; and
      (iii) the balance being 4,4'-diphenylmethane diisocyanate;
      wherein the sum of the %'s by weight of (1)(b)(i), (1)(b)(ii) and (1)(b)(iii) total 100% by weight of (1)(b); and
  (2) a polyether polyol having a molecular weight of about 1,000 to about 10,000, an OH number of about 337 to about 14 and a functionality of at least about 2.5,
    with the proviso that said polyether polyol is selected from the group consisting of:
      (i) a KOH catalyzed polyether polyol containing at least about 5% by weight of ethylene oxide groups, based on 100% by weight of alkylene oxide groups, and
      (ii) a low unsaturation polyether polyol containing a maximum of 0.01 meq/g unsaturation; and (B) an isocyanate-reactive component comprising:
  (1) from 35 to 80% by weight, based on 100% by weight of (B), of a high molecular weight amine-terminated polyether polyol having a functionality of from about 2 to about 5;
  (2) from 20 to 65% by weight, based on 100% by weight of (B), of an aromatic diamine chain extender having a molecular weight of about 100 to about 500; and
  (3) from 0 to 5% by weight, based on 100% by weight of (B), of one or more chain extenders or crosslinkers having a molecular weight of about 200 to about 600 and a functionality of about 1.5 to about 6, wherein said compound is selected from the group consisting of (a) aliphatic amine terminated polyether polyols and aliphatic hydroxyl terminated polyether polyols;
optionally, in the presence of
(C) one or more internal mold release agents;
(D) one or more surfactants;
(E) one or more fillers; and/or
(F) water;
at an Isocyanate Index of about 70 to about 130, preferably of about 80 to about 110.

The present invention also relates to a process for the production of high performance reaction injection molded (RIM) poly(urethane)urea elastomers. This process comprises (1) reacting a reaction mixture as described above, with the reaction mixture being process as a one-shot system by the RIM process at an isocyanate index of about 70 to about 130, preferably of about 80 to about 110.

DETAILED DESCRIPTION OF THE INVENTION

Suitable allophanate-modified diphenylmethane diisocyanate prepolymers to be used as component (A) in the present invention include those having an NCO group content of about 5 to about 30% by weight, preferably about 13 to about 19% by weight and most preferably about 15 to about 17% by weight. These allophanate-modified prepolymers are generally known and are described in, for example, U.S. Pat. Nos. 5,319,053 and 5,440,003, the disclosures of which are herein incorporated by reference.

These allophanate-modified diphenylmethane diisocyanate prepolymers comprise the reaction product of:
(1) an allophanate-modified diphenylmethane diisocyanate having an NCO group content of about 12 to about 32.5% by weight, preferably about 26 to about 31% by weight, and most preferably about 28 to about 31% by weight, and comprises the reaction product of:
  (a) an aliphatic alcohol or an aromatic alcohol; and
  (b) diphenylmethane diisocyanate comprising:
    (i) from about 0 to 60%, preferably about 1.5 to 25%, by weight of 2,4'-diphenylmethane diisocyanate,
    (ii) less than about 6%, preferably about 0 to about 0.7%, by weight of 2,2'-diphenylmethane diisocyanate, and
    (iii) the balance being 4,4'-diphenylmethane diisocyanate, wherein the sum of the %'s by weight of (1)(b)(i), (1)(b)(ii) and (1)(b)(iii) totals 100% by weight of (1)(b); and
(2) a polyether polyol having a molecular weight of about 1,000 to about 10,000, preferably 2,000 to 6,000 and most preferably 2,500 to 6,000, an OH number of about 337 to about 14, preferably about 169 to about 17 and most preferably about 79 to about 23, and a functionality of at least about 2.5, preferably about 2.5 to about 6, and most preferably about 2.5 to about 3.5;
  with the proviso that (2) said polyether polyol is selected from the group consisting of:
    (i) a KOH catalyzed polyether polyol containing at least 5% by weight, preferably from 10 to 30% by weight, of ethylene oxide groups, based on 100% by weight of alkylene oxide groups present, and
    (ii) a low unsaturation polyether polyol containing a maximum of 0.01 meq/g, preferably no more than 0.007 meq/g, of unsaturation.

Suitable allophanate-modified diphenylmethane diisocyanates having an NCO group content of about 12 to about 32.5% by weight to be used as component (A)(1) of the allophanate-modified prepolymers (A) of the present invention include those which are known and described in, for example, U.S. Pat. Nos. 5,319,053 and 5,440,003, the disclosures of which are herein incorporated by reference.

Suitable (a) aliphatic alcohols and aromatic alcohols which can be used to prepare the allophanate-modified diphenylmethane diisocyanates, i.e. component (A)(1), of the present invention include those that can react with the diphenylmethane diisocyanates to form allophanates in accordance with the present invention.

In general, the useful aliphatic alcohols are those which contain from about 1 to about 36, and preferably from about 4 to about 16 carbon, atoms. Examples of suitable aliphatic alcohols include compounds such as cycloaliphatic alcohols, aliphatic alcohols containing aromatic groups, aliphatic alcohols containing groups which do not react with isocyanates, e.g. ether groups and/or halogen atoms such as, for example, bromine and chlorine, etc. Some specific aliphatic alcohols which are suitable for the present invention include compounds such as 1-butanol, isobutyl alcohol, cetylalcohol, cyclohexanol, 2-methoxyethanol, and 2-bromoethanol.

Suitable aromatic alcohols to be used as component (A)(1)(a) in the present invention include those aromatic alcohols containing from 6 to 18 carbon atoms, preferably from 6 to 12 carbon atoms. Aromatic alcohols suitable for the present invention include those aromatic alcohols wherein the alcoholic hydroxyl group is attached to the aromatic ring of the compound. Some specific examples of such aromatic alcohols include compounds such as, for example, phenol, 1-naphthol, 2-naphthol, m-cresol, o-chlorophenol, p-bromophenol, m-nitrophenol and o-fluorophenol.

The diphenylmethane diisocyanate to be used as component (A)(1)(b) in the present invention is characterized by a specific isomer distribution as described above.

These allophanate-modified diphenylmethane diisocyanates used as component (A)(1) of the present invention are stable, liquid compounds at 25° C. Stable, liquid allophanate-modified diphenylmethane diisocyanates can be prepared by first pre-reacting the specified diphenylmethane diisocyanate with an aliphatic alcohol at a temperature of 20 to 115° C. to form a urethane, followed by addition of a suitable catalyst at 60 to 120° C. which subsequently converts the urethane to an allophanate. Alternatively, the aliphatic alcohol and the diphenylmethane diisocyanate and the appropiate catalyst can be added together at 40–60° C., and heated to about 60–120° C. to form the allophanate-modified diphenylmethane diisocyanate directly.

Typically, the catalyst used to form the allophanate-modified diphenylmethane diisocyanate (A)(1) is neutralized before the reaction with (2) a polyether polyol as further described herein to form the allophanate-modified prepolymer (A). Suitable catalysts include, for example, those that can be neutralized or otherwise stopped from adversely affecting subsequent reaction. One particularly suitable such catalyst is zinc acetylacetonate, and a particularly suitable stopper is benzoyl chloride. Other suitable catalysts and stoppers are known and described in, for example, U.S. Pat. No. 5,319,053. These include, for example, zinc 2-ethylhexanoate, cobalt 2-ethylhexanoate, cobalt naphthanate, lead linoresinate, etc. as allophanate catalysts. Other catalyst stoppers include, for example, anhydrous hydrochloric acid, sulfuric acid, bis(2-ethylhexyl)hydrogen phosphate, Lewis acids, etc. Typically, the catalysts stopper is used in an amount such that there are 2 equivalents of stopper to each mole of the catalyst.

The term "stable" as used herein, means that the allophanate-modified diphenylmethane diisocyanate has up to 1% absolute change in the NCO group content and up to 10% change in the viscosity when stored at 25° C. for 3 months. The term "liquid" as used herein means that the allophanate-modified diphenylmethane diisocyanate does not precipitate solids when stored at 25° C. for 3 months.

In forming (A) the prepolymer of the allophanate modified diphenylmethane diisocyanate, the above described (1) allophanate-modified diphenylmethane diisocyanate is further reacted with (2) a suitable polyether polyol. Polyether polyols suitable for the present invention are those having molecular weights of about 1,000 to about 10,000, preferably about 2,000 to about 6,000 and most preferably about 2,500 to about 6,000, an OH number of about 337 to about 14, preferably about 169 to about 17 and most preferably about 79 to about 23, and a functionality of at least about 2.5, preferably about 2.5 to about 6, and most preferably about 2.5 to about 3.5.

These polyether polyols generally fall into two different types of polyether polyols, i.e. those which are KOH catalyzed and those which are low unsaturation polyether polyols.

The KOH catalyzed polyether polyols suitable herein contain at least about 5%, preferably 10 to 30%, and most preferably 10 to 20%, by weight of ethylene oxide groups, based on 100% by weight of alkylene oxide groups present. These polyether polyols are known in the art and may be prepared by the reaction of suitable starting compounds which contain reactive hydrogen atoms with alkylene oxides such as, for example, ethylene oxide, propylene oxide, butylene oxide, styrene oxide, tetrahydrofuran, epichlorohydrin, and mixtures thereof, provided that the resultant polyether polyol contains at 5% by weight of ethylene oxide groups as described above. Suitable starting compounds containing reactive hydrogen atoms include compounds such as, for example, ethylene glycol, propylene glycol, butylene glycol, hexanediol, octanediol, neopentyl glycol, cyclohexandimethanol, 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol, polybutylene glycol, glycerine, trimethylolpropane, pentaerythritol, water, methanol, ethanol, 1,2,6-hexane triol,1,2,4-butane triol, trimethylol ethane, mannitol, sorbitol, methyl glycoside, sucrose, phenol, resorcinol, hydroquinone, 1,1,1- or 1,1,2-tris-(hydroxyphenyl)-ethane, etc.

The low unsaturation polyether polyols suitable for the present invention have a maximum amount of 0.01 meq/g of unsaturation, preferably no more than 0.007 meq/g unsaturation. These low unsaturation polyether polyols are known and described in, for example, U.S. Pat. Nos. 5,106,874, 5,576,382, 5,648,447, 5,670,601, 5,677,413, 5,728,745, 5,849,944 and 5,965,778, the disclosures of which are herein incorporated by reference.

These polyether polyols containing low unsaturation must be used and must be prepared with this low level of unsaturation. The measured unsaturation (ASTM test method D-2849-69) must be less than 0.010 meq/g for the polyol blend. Furthermore, the individual polyols, regardless of the overall blend unsaturation, must have individual unsaturations of less than 0.010 meq/g. Preferred are polyol blends where the overall unsaturation is less than 0.007 meq/g and no individual polyol has an unsaturation greater than 0.010. Most preferred is the use of individual polyols in the blend where each polyol has a measured unsaturation of less than about 0.007 meq/g.

Thus, the major portion of the polyol blend, in order to have an overall unsaturation of less than 0.010 meq/g, must be an essentially monodisperse polyoxypropylene polyol which is preferably prepared by polymerizing propylene oxide onto an initiator molecule of suitable functionality in the presence of a substantially amorphous double metal cyanide. TBA catalysts such as those prepared as disclosed in U.S. Pat. No. 5,470,813, the disclosure of which is herein incorporated by reference. Suitable examples of catalyst preparation and polyol preparation are given in the Referential Examples therein.

The polyether polyols useful as component (A)(2) in the present invention are preferably prepared by polymerizing propylene oxide or a mixture of propylene oxide and another alkylene oxide having more than 2 carbon atoms, for example, 1,2-butylene oxide, 2,3-butylene oxide, oxetane, or tetrahydrofuran, onto a suitably functional initiator molecule, in the presence of a catalytically effective amount of a substantially amorphous double metal cyanide TBA catalyst, preferably zinc hexacyanocobalt TBA. Other synthetic methods which result in low unsaturations of less than 0.010 meq/g, preferably 0.007 meq/g or less are also suitable. By the term "polyoxypropylene polyol" and like terms is meant a polyol wherein the major portion of oxyalkylene groups are oxypropylene groups.

If a most minor amount of ethylene oxide, or if another alkylene oxide, for example, butylene oxide, is to be copolymerized with propylene oxide in random (heteric) fashion, the two alkylene oxides may simply be added simultaneously to the pressurized reactor. Surprisingly, this process cannot, at present, be utilized to provide polyoxyethylene capped polyoxypropylene homo or random copolymers, but rather, ethylene oxide desired to be added as a cap should be polymerized in the presence of an alternative catalyst, preferably an alkali metal hydroxide.

The amount of randomly copolymerized ethylene oxide should be most minor, i.e. from 0 to about 1% or thereabouts, as the polyol backbone should be substantially all polyoxypropylene or polyoxypropylene copolymerized with another alkylene oxide having more than two carbon atoms. Ethylene oxide derived moieties may be present as a cap when blends of polyols are utilized as described herein or in microcellular elastomers, and in such cases it is preferable that the weight percent of such cap be from 3 weight percent to about 30 weight percent, preferably 5 weight percent to 25 weight percent, and most preferably from about 10 weight percent to about 20 weight percent based on the weight of the finished polyol. For purposes of preparation of low water absorption elastomers, it is preferred that the total ethylene oxide content of the polyol, both external (cap) and any minor internal oxyethylene moieties, be less than 15 weight percent, more preferably less than 10 weight percent. Preferably, all propylene oxide-derived polyoxypropylene polyols are used.

The polyol blends useful in the subject invention include polyoxyalkylene polyols having equivalent weights of from 400 g/mole to 10,000 g/mole or higher, preferably 400 g/mole to 8000 g/mole, and more preferably 500 g/mole to 8000 g/mole, providing polyol components having average equivalent weights in the range of 1000 g/mole to 8000 g/mole. The low unsaturation polyols of the subject invention may have nominal (i.e. initiator) functionalities from 2 to 8, preferably 2 to 6, and most preferably 2 to 3. Diols or mixtures of diols and triols are preferred, particularly polydisperse blends of monodisperse diols, while in some formulations additions of minor portions of tetrols or hexols, for example, may lead to increases in desirable properties.

Suitable initiators are well known to those skilled in the art, and include, for example, ethylene glycol, propylene glycol, 1,4-butanediol, glycerine, trimethylolpropane, pentaerythritol, .alpha.-methylglucoside, sorbitol, sucrose, ethylene diamine, propylene diamine, toluenediamine, diethylenetriamine, and the like. In preparing the ultra-low unsaturation polyols, the chosen initiator or initiator mixture is generally first oxyalkylated with a non-DMC catalyst to a low molecular weight polyoxyalkylene oligomer having an equivalent weight in the range of 200–400 g/mole, although lower and higher molecular weight oligomers may be used.

In the present invention, (B) the isocyanate-reactive component comprises (1) from 35 to 80%, preferably from 45 to 70% by weight, based on 100% by weight of (B) of a high molecular weight amine terminated polyether polyol; (2) from 20 to 65%, preferably from 30 to 55% by weight, based on 100% by weight of (B) of a chain extender comprising an aromatic diamine and having a molecular weight of about 100 to about 500; and, (3) from 0 to 5%, preferably 0 to 3% by weight, based on 100% by weight of (B) of a chain extender or crosslinker having a molecular weight of 200 to 600, a functionality of about 1.5 to about 6, and being selected from the group consisting of (a) aliphatic amine terminated polyether polyols and (b) aliphatic hydroxyl terminated polyether polyols.

Suitable amine-terminated polyethers to be used as component (B)(1) according to the invention include, for example, polymers containing aromatically bound isocyanate-reactive primary or secondary (preferably primary) amino groups and/or aliphatically bound isocyanate-reactive primary or secondary amino groups and having a molecular weight of from greater than about 1,000 up to about 15,000, preferably about 1,000 to about 5,000, and most preferably about 2,000 to 4,000. Suitable amine-terminated polyethers contain about 2 to about 5, preferably about 2 to about 4, and most preferably 3 amino groups. Compounds containing amino end groups can also be attached to the polymer chain through urethane or ester groups. The preferred liquid amine-terminated polymers are liquids at room temperature and have viscosities of less than about 20,000 mPa·s at 25° C.

Suitable amine-terminated polyethers can be prepared by any of several methods known in the art. Since most of these methods use hydroxyl-functional polyethers as starting materials, the reactions do not necessarily have to be taken to completion in order to provide amine-terminated polyethers of the present invention, i.e., polyethers having at least two isocyanate reactive groups and a molecular weight of from about 1,000 to about 15,000 in which at least 50% of the isocyanate reactive groups are primary and/or secondary amino groups.

Particularly preferred liquid amine-terminated polymers are amine-terminated polyethers that contain primary amino groups attached to the polyether on an aliphatic hydrocarbon residue. These amine-terminated polyethers are commercially available from the Huntsman Corporation of Houston, Tex. under the trademark Jeffamine®. These include compounds such as, for example, Jeffamine D-2000, Jeffamine D-4000, Jeffamine T-3000 and Jeffamine T-5000. These amine-terminated polyethers are prepared from polyhydroxypolyethers (e.g., polypropylene glycol ethers) by reaction with ammonia in the presence of hydrogen and catalysts as described in, for example, U.S. Pat. Nos. 3,654,370, 4,396,729, 4,448,904, 4,474,900, 4,474,901, 4,582,887, 4,585,850 and 4,607,090, the disclosures of which are herein incorporated by reference. Amine-terminated polyethers having low end group unsaturation of about 0.01 to about 0.06 are known and described in, for example, U.S. Pat. Nos. 4,902,777 and 5,100,997, the disclosures of which are herein incorporated by reference, can also be suitable for the present invention. Other amine-terminated polyether polyols such as those prepared by hydrogenation of cyanoethylated polyoxypropylene ethers as described in, for example German Patent 1,193,671 and U.S. Pat. No. 3,267,050, the disclosures of which are herein incorporated by reference. Other methods for the preparation of polyoxyalkylene polyamines are described in U.S. Pat. Nos. 3,155,728 and 3,236,895 and French Patent 1,551,605.

Suitable amine-terminated polyethers can be obtained by the hydrolysis of various polymers containing isocyanate and other end groups. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Suitable amine-terminated polyethers can be prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595, the disclosures of which are herein incorporated by reference. Relatively high molecular weight compounds containing amino end groups may also be obtained according to U.S. Pat. No. 3,865,791 (believed to correspond to German Offenlegungsschrift 2,546,536) or U.S. Pat. No. 3,865,791, the disclosures of which are herein incorporated by reference, by reacting isocyanate prepolymers based on polyhydroxy polyethers with hydroxyl-containing enamines, aldimines, or ketimines and hydrolyzing the reaction products.

Other suitable amine-terminated polyethers include aminophenoxy-substituted polyethers described, for example, in European Patent Applications 288,825 and 268,849. Aminophenoxy-substituted polyethers can also be prepared, for example, by converting polyether polyols into nitrophenoxy-terminated polyethers (by reaction, for example, with chloronitrobenzenes), followed by hydrogenation. E.g., U.S. Pat. Nos. 5,079,225 and 5,091,582. In a preferred method, aminophenoxy-substituted polyethers are prepared by converting polyether polyols into the corresponding sulfonate derivatives, followed by reaction of the polyether sulfonate with an aminophenoxide.

Suitable amine-terminated polyethers also include aliphatic amine-terminated polyethers prepared by the mesylate method described, for example, in U.S. Pat. No. 5,693,864. In a preferred method, polyether polyols are converted into corresponding derivatives having suitable leaving groups (such as halide or sulfonate groups) that in turn react with primary amines to form secondary amine-terminated polyethers.

Other suitable amine-terminated polyethers include aminobenzoic acid esters of polyether polyols described, for example, in U.S. Pat. No. 5,219,973. These aminobenzoate derivatives are prepared by reaction of polyether polyols with metanitrobenzoic acid or, preferably, metanitrobenzoyl chloride to form corresponding nitrobenzoic acid esters that are then hydrogenated to the amines.

Although generally less preferred, suitable amine-terminated polyethers also include certain aminocrotonate-terminated derivatives of polyethers prepared from acetoacetate-modified polyethers as described, for example, in U.S. Pat. Nos. 5,066,824, 5,151,470, and 5,231,217.

Suitable compounds to be used as component (B)(2) herein include those aromatic diamines having a molecular weight of about 100 to about 500, preferably about 100 to about 300 and most preferably about 150 to about 200.

Examples of suitable aromatic amines include, for example, aromatic diamines, having molecular weights as described above include, for example, 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene, dimetaxylene diamine and mixtures of the above diamines, such as, for example, mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic diamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenyl-methane-4,4',4"-triamine. The difunctional aromatic amine compounds may also exclusively or partly contain secondary amino groups such as 4,4'-di-(methylamino)-diphenylmethane or 1-methyl-2-methylamino-4-amino-benzene. Liquid mixtures of diphenyl dimethylene-diamines, of the type obtained by condensing aniline with formaldehyde, are also suitable.

Preferred amine compounds to be used as component (B)(2) are, 1-methyl-3,5-diethyl-2,4-diamino benzene, 1-methyl-3,5-diethyl-2,6-diamino benzene, and mixtures thereof. It is particularly preferred to use 1-methyl-3,5-diethyl-2,4-diamino benzene, 1-methyl-3,5-diethyl-2,6-diamino benzene, and mixtures thereof, as (B)(2).

Suitable compounds to be used as (B)(3) when present in accordance with the invention, include those chain extender and/or crosslinkers having molecular weights of from 200 to 600, preferably 250 to 600, and most preferably from 300 to 500, and having functionalities of from about 1.5 to about 6, preferably about 1.5 to about 5.5, and most preferably from about 1.5 to about 5. These compounds are selected from the group consisting of (a) aliphatic amine terminated polyether polyols and (b) aliphatic hydroxyl terminated polyether polyols.

Some examples of suitable (B)(3)(a) aliphatic amine terminated polyether polyols include compounds such as, for example, those compounds containing primary or secondary (preferably primary) aliphatically bound amino groups, wherein amino end groups can also be attached to the polyether chain through urethane or ester groups. Suitable compounds include, for example, Jeffamine D-400 and Jeffamine D-230, which are commercially available from Huntsman Chemical Corporation.

These low molecular weight aliphatic amine-terminated polyethers can be prepared by any of several methods known in the art. For example, aliphatic amine-terminated polyethers can be prepared from polyhydroxyl polyether (e.g., polypropylene glycol ethers) by a reaction with ammonia in the presence of Raney nickel and hydrogen (Belgium Patent No. 634,741). Polyoxyalkylene polyamines can be prepared by reaction of the corresponding polyol with ammonia and hydrogen in the presence of a nickel, copper, or chromium catalyst (U.S. Pat. No. 3,654,370). The preparation of polyethers containing aliphatically bound amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary aliphatically bound amine end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups and are then hydrolyzed in a second step to amino groups.

Processes for the production of useful aliphatic amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, 4,931,595 and 5,283,364.

The aliphatic amine terminated polyethers used in the present invention can be mixtures with any of the above-mentioned compounds.

Suitable aliphatic hydroxyl terminated polyether polyols to be used as component (B)(3)(b) in the present invention include compounds such as, for example, diols, triols, tetraols, diamines, triamines, etc. Of course, it is also possible to use a mixture of these various compounds. Ethylene oxide adducts and/or propylene oxide adducts based on these compounds are also suitable, provided that the molecular weight of the adduct satisfies the above requirements with respect to molecular weight. Suitable diols, triols, tetrols, diamines, triamines, etc. include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, 2,2,4-trimethylpentane-1,3-diol, and pentaerythritol, etc. Preferred diols, triols, tetrols, diamines and triamines to be used as component (B)(3)(b) include, for example, 2-methyl-1,3-propanediol, trimethylolpropane, diethylene glycol, triethylene glycol, glycerine and propylene glycol, ethylene diamine, as well as propylene oxide adducts and ethylene oxide/propylene oxide adducts of these compounds.

Particularly preferred compounds to be used as B)(3)(b) in the present invention include, for example, Jeffamine D-400, an aliphatic amine terminated polyether having a molecular weight of about 400 and a functionality of about 2, and a polyether polyol having a molecular weight of about 350, a functionality of about 4, and an OH of about 630, which comprises the propoxylation adduct of ethylene diamine.

In accordance with the present invention, it is preferred to use an internal mold release (IMR) agent. In general, when an internal mold release agent is included, it is present in an amount such that there is a minimum of about 0.5 parts by weight and a maximum of about 4.0 parts by weight of internal mold release agent based on 100 parts by weight of component (B) present.

Some examples of suitable compounds to be used as component (C) internal mold release agents in the present invention include, for example, compounds such as a metal salt of a carboxylic acid, amidocarboxylic acid, phosphorus-containing acid or boron-containing acid. The metal is from Group IA, IB, IIA, or IIB metal or aluminum, chromium, molybdenum, iron, cobalt, nickel, tin, lead, antimony or bismuth. The internal mold release (IMR) composition comprises (a) a metal salt of a carboxylic acid, amido carboxylic acid, phosphorus-containing acid or boron-containing acid wherein (1) the acid contains at least one lipophilic group which renders it incompatible with an active hydrogen containing composition and (2) the metal is chosen from those metals in Groups IA, IB, IIA and IIB of the Periodic Table of the Elements, aluminum, chromium, molybdenum, iron, cobalt, nickel, tin, lead, antimony and bismuth. Internal mold release agents, in general, require a compatibilizing amount of an organic compound such as described herein above as component (B)(3).

Suitable carboxylic acids which can be employed herein as a component in the internal mold release composition include saturated or unsaturated aliphatic or cycloaliphatic carboxylic acids or aromatic carboxylic acids; preferably those carboxylic acids having from about 7 to about 30, preferably from about 10 to about 18, carbon atoms. Preferably the acid is a so-called "fatty acid" having from about 10 to 18 carbon atoms. Such fatty acids include, for example, oleic, stearic, lauric, palmitic, linoleic, ricinoleic and like acids as well as mixtures thereof. Suitable carboxylic acids include amido-containing carboxylic acids such as the reaction products of carboxylic acid halides containing from 1 to 30, preferably from 2 to 18, more preferably from 5 to 18, carbon atoms with an amino carboxylic acid having from 2 to 4, preferably from 2 to 3, carbon atoms per molecule.

Particularly suitable such amine containing carboxylic acids include for example, oleoyl sarcosine, lauryl sarcosine, capryl sarcosine, oleoyl glycine, octanol glycine, oleoyl hydroxyethyl glycine, and mixtures thereof. These amido carboxylic acids can be prepared by the Schotten-Baumann acylation reaction wherein an acyl halide is reacted with an amino acid.

Suitable materials containing at least one carboxylic acid group and containing siloxane chains include those described by J. W. Keil in U.S. Pat. No. 4,076,695, the disclosure of which is herein incorporated by reference.

Suitable organic materials containing at least one phosphorus-containing acid group include, for example, monostearyl acid phosphate, cetyl dihydrogen phosphate, monolauryl phosphate, decyl dihydrogen phosphate, monobutyl monodecyl ester of phosphoric acid, and mixtures thereof.

Suitable organic materials containing at least one boron-containing acid group include, for example, dioctadecyl ester of boric acid, monododecyl mono(phenylmethyl)ester of boric acid, monododecyl monophenyl ester of boric acid, monoheptadecyl mono(phenylmethyl)-ester of boric acid, monodecyl ester of boric acid, and mixtures thereof.

Suitable metal salts of the aforementioned acids include those wherein the metal is selected from Groups I or II of the Periodic Table of the Elements, aluminum, chromium, molbydium, iron, cobalt, nickel, tin, lead, antimony or bismuth. Preferably the metal is lithium, sodium, potassium, copper, magnesium, calcium, barium, zinc, cadmium, aluminum, chromium, iron, cobalt, nickel, tin, lead, antimony, or bismuth or combinations thereof. More preferably the metals are lithium, copper, magnesium, calcium, barium, zinc, cadmium, aluminum, iron, cobalt, or nickel or combinations thereof. Most preferred are zinc, calcium, magnesium and nickel.

Particularly suitable metal acid salts include, for example, zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate, copper palmitate, zinc stearoyl sarcosinate, zinc oleoyl sarcosinate, zinc palmitoyl sarcosinate, zinc lauroyl sarcosinate, calcium stearoyl sarcosinate, calcium oleoyl sarcosinate, calcium palmitoyl sarcosinate, calcium lauroyl sarcosinate, magnesium stearoyl sarcosinate, magnesium oleoyl sarcosinate, magnesium palmitoyl sarcosinate, magnesium lauroyl sarcosinate, nickel stearoyl sarcosinate, nickel oleoyl sarcosinate, nickel palmitoyl sarcosinate, nickel lauroyl sarcosinate, copper stearoyl sarcosinate, copper oleoyl sarcosinate, copper palmitoyl sarcosinate, copper lauroyl sarcosinate or mixtures thereof.

The acid metal salts described hereinbefore can be prepared by reacting the corresponding acid with an appropriate quantity of a compound containing the metal such as a hydroxide. If the metal is above hydrogen in the electromotive series, it can be reacted directly with the acid or acid amide. Mixtures of the foregoing metal acid salts which are available commercially can be employed if desired. Additional details concerning these internal mold release agents can be found in U.S. Pat. No. 4,585,803, the disclosures of which are herein incorporated by reference.

A preferred group of internal mold release agents to be used as component (C) in the present invention includes metal salts of carboxylic acids including, for example, zinc carboxylates which are based on $C_8$ to $C_{24}$, branched or straight chain fatty acids, which may be saturated or unsaturated. The carboxylates also include the commercial preparations of a specific carboxylate which also contains impurities or by-products of other fatty acid derivatives. For example, commercial "stearates" may also contain significant quantities of palmitates, myristates, etc. and commercial "tall oil" derivatives normally contain mixtures of stearates, palmitates, oleates, etc. Examples of specific zinc carboxylates include zinc stearate, zinc oleate, zinc octoate, zinc laurate, zinc behenate, zinc ricinoleate and the like. Suitable IMR's such as these are described in additional detail in, for example U.S. Pat. Nos. 4,519,965, 4,581,386, 5,002,999, 5,076,989, 5,211,749 and 5,420,188, the disclosures of which are herein incorporated by reference. Zinc stearate is a particularly preferred internal mold release agent.

Some examples of suitable surfactants to be used as component (D) in the present invention include, for example, surface-active additives such as emulsifiers. Examples of these include N-stearyl-N',N'-bis-hydroxyethyl urea, oleyl polyoxyethylene amide, stearyl diethanol amide, isostearyl diethanol-amide, polyoxyethylene glycol monoleate, a pentaerythritol/adipic acid/-oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives. Suitable surfactants also include polyether siloxanes. The structure of these compounds is generally such that a copolymer of ethylene oxide and propylene oxide is attached to a polydimethyl siloxane radical. Such surfactants are described in, for example, U.S. Pat. No. 2,764,565, the disclosure of which is herein incorporated by reference. Preferred commercially available surfactants include the silicone surfactants Tegostab B-8418, B-4690 and B-4113, which are available from Goldschmidt; DC5357, available from Air Products and L620, available from OSI Specialties of Crompton Corporation.

Suitable fillers to be used as component (E) in accordance with the present invention includes inorganic compounds such as, for example, compounds such as glass in the form of fibers, flakes, cut fibers, mats, or microspheres; mica, wollastonite; muscovite mica; carbon fibers; carbon black; talc; and calcium carbonate. Suitable organic compounds include, for example, expanded microspheres which are known and described in, for example, U.S. Pat. Nos. 4,829,094, 4,843,104, 4,902,722 and 5,244,613, the disclosures of which are herein incorporated by reference. These include commercially available microspheres such as, for example, Dualite M6017AE, Dualite M6001AE and Dualite M6029AE, all of which are available from Pierce and Stevens Corporation, and Expandocel which is available from Nobel Industries.

The addition of these fillers and reinforcing agents to the reaction mixture of the presently claimed invention, make the molded parts particularly suitable for use in RIM (i.e. reaction injection molding), RRIM (i.e. reinforced reaction injection molding) and SRIM (i.e. structural reaction injection molding) applications.

Water, component (F), may also be present in the reaction of (A) the allophanate-modified MDI prepolymer with (B) the isocyanate-reactive component.

The compositions according to the present invention may be molded using conventional processing techniques at isocyanate indexes ranging from about 70 to 130, preferably from 90 to 110. By the term "Isocyanate Index" (also commonly referred to as "NCO index"), is defined herein as the equivalents of isocyanate, divided by the total equivalents of isocyanate-reactive hydrogen containing materials, multiplied by 100. When water is present in the reaction systems of the present invention, the quantity of water present is not considered in calculating the isocyanate index.

As used herein, the term "molecular weight" refers to the number average molecular weight as determined by end-group analysis. Also, as used herein, the term "number average functionality" refers to the functionality of a blend of polyisocyanates or polyols of different functionalities, averaged over the total weight of the blend.

In accordance with the present invention, high mold temperatures are not necessary and/or desirable for safety reasons. It is preferred that mold temperatures are less than 90° C., and more preferably less than 85° C.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used to make allophanate-modified prepolymers.

| | |
|---|---|
| Polyol A: | a glycerine/propylene oxide adduct having an OH number of 56 and a functionality of 2.8. |
| Polyol B: | a glycerine started polyether of propylene oxide and ethylene oxide (83 wt. % PO and 17 wt. % EO) having an OH number of 60 and a funtionality of 2.9. |
| Polyol C: | a propylene glycol/propylene oxide adduct having an OH number of 56 and a functionality of 1.9. |
| Polyol D: | a glycerine/propylene glycol started polyether of propylene oxide having an OH number of 56, a functionality of 2.8 and a maximum unsaturation content of 0.007 meq/g. |
| Polyol E: | a propylene glycol started polyether of propylene oxide and ethylene oxide (80 wt. % PO and 20 wt. % EO) having an OH number of 28 and a functionality of 1.8. |
| Polyol F: | a glycerine started polyether of propylene oxide and ethylene oxide (83 wt. % PO and 17 wt. % EO) having an OH number of 35 and a functionality of 2.6. |
| Polyol G: | a trimethylolpropane started polyether of epoxybutene having an OH number of 72 and a nominal functionality of 3. |
| MDI-x: | diphenylmethane diisocyante which contains less than 6% by weight 2,2'-MDI and in which x represents the percent by weight 2,4'-MDI and 100-x represents the percent by weight 4,4'- and 2,2'-MDI. |
| Isocyante A: | Uretoneimine modified MDI-2 with a 29.3% NCO. |
| Isocyante B: | To 56.8 parts of MDI-2 at 50° C. was added 1.0 part of isobutanol. The mixture was heated to 90° C., at which time 75 ppm zinc acetylacetonate was added. The reation mixture was held at 90° C. for 1.5 hours followed by the addition of 150 ppm benzoyl chloride. The mixture had an NCO content of 31.0%. |
| Prepolymer A: | An isocyanate terminated prepolymer obtained from reacting mixture of 45 parts MDI-2 and 10 parts isocyanate A with 45 parts Polyol B to a final NCO content of 16%. |
| Prepolymer B: | Isocyanate B (57.7 parts) was held at 60° C., at which time 42.2 parts of Polyol B was added. After 1.5 hours at 60° C., the product was cooled to 25° C. The clear liquid allophanate modified prepolymer had an NCO content of 16.1% and a viscosity at 25° C. of 1032 mPa · s. |
| Prepolymer C: (not in accordance with the invention) | To 17.7 parts of MDI-2 at 50° C. was added 1.0 part of isobutanol. The mixture was heated to 90° C., at which time 75 ppm zinc acetylacetonate was added. The reation mixture was held at 90° C. for 1.5 hours followed by the addition of 150 ppm benzoyl chloride. The mixture had an NCO content of 26.0%. The allophonate modified MDI was cooled to 60° C. at which time 35.9 parts of MDI-52 was added. After blending at 60° C., 45.4 parts of Polyol E was added and the reaction mixture was held at 60°0 C. for 1.5 hours followed by cooling to 25° C. The clear liquid allophonate modified prepolymer had an NCO content of 16.1% and a viscosity at 25° C. of 730 mPa · s. |
| Prepolymers D-1: | The procedure of Prepolymer B was repeated using the material and amount listed in Table 1. A clear liquid product, which was storage stable at 25° C., was obtained in each of these polymers. The % NCO and viscosity of each prepolymer is also reported in Table 1. |

TABLE 1

| Prepolymer | Formulation, pbw | | % NCO | Visc @ 25° C., cps |
|---|---|---|---|---|
| D | 58.0 | Isocyanate B | 16.0 | 1480 |
|   | 31.8 | Polyol B |   |   |
|   | 10.2 | Polyol G |   |   |
| E | 57.4 | Isocyanate B | 16.1 | 1070 |
|   | 42.6 | Polyol D |   |   |
| F* | 57.4 | Isocyanate B | 16.1 | 569 |
|   | 42.6 | Polyol C |   |   |
| G* | 57.4 | Isocyanate B | 15.9 | 1170 |
|   | 42.6 | Polyol A |   |   |
| H | 55.6 | Isocyanate B | 15.9 | 810 |
|   | 44.4 | Polyol F |   |   |
| I | 57.1 | Isocyanate B | 15.8 | 1126 |
|   | 42.9 | Polyol D |   |   |

*(not in accordance with the invention)

RIM Examples:

Liquid isocyanate prepolymers were used to produce reaction injected molded articles. The specific materials and the amounts of those materials used are reported in the Tables which follow. A description of the materials is set forth hereinbelow. The polyurethane-forming system of Examples 1–4 & 8–11 was injected using a Hennecke RIMDOMAT RIM machine. The isocyanate-reactive materials and various additives were put into the B-side of the machine, and the appropriate quantities of the specific prepolymer were loaded into the A-side. The RIMDOMAT was equipped with a Hennecke mq8 Mixhead. The B-side was preheated to 80° C. and the A-side was heated to 50° C. The materials were injected at an injection pressure of 200 bar and an injection rate of 400 grams/sec. The material was injected into a flat plaque mold of 3×200×300 mm heated to 75° C. After a 30 second dwell time, the part was demolded. Physical properties were determined in accordance with ASTM standards.

The polyurethane-forming system of Examples 5–7 was injected using a Cincinnati Milacron CM-90 RRIM machine. The isocyanate-reactive materials and various additives were put into the B-side of the machine, and the appropriate quantities of the specific isocyanate were loaded into the A-side. The B-side was preheated to 60° C. and the A-side was heated to 32° C. The materials were injected at an injection pressure of 152 bar and an injection rate of 4733 grams/sec. The material was injected into a flat plaque steel mold (P-20 steel) having the dimensions of 4.5×640× 920 mm heated to 75° C. After a 30 second dwell time, the part was demolded. Physical properties were determined in accordance with ASTM standards The following components were used in the RIM examples:

| | |
|---|---|
| DETDA: | an 80:20 mixture of 1-methyl-3,5-diethyl-2,4- and 2,6-phenyl diamine |
| Amine A: | an amine-terminated polyether polyol having a functionality of about 2 and a molecular weight of about 400, commercially available from Huntsman as Jeffamine D-400 |
| Amine B: | an amine-terminated polyether polyol having a functionality of about 3 and a molecular weight of about 3000, commercially available from Huntsman as Jeffamine T-3000 |
| Polyol H: | an ethylene diamine started polyether of propylene oxide having an OH number of 630 and a functionality of 4. |
| IMR A: | zinc stearate |
| B8418: | a commercially available surfactant from Goldschmidt |
| Filler: | a muscovite mica commercially available from Ogelbay-Norton and known as HiMod 270. |
| Prepolymers A-1: | see description above |

Examples 1–7 serve to define the allophanate modified prepolymers that are suitable for this patent while Examples 8–11 are comparative allophanate and non-allophanate examples. Parts made from allophanate modified prepolymers using the polyols defined by the invention, as in Examples 1–7, have good green strength as opposed to parts made with allophanate modified prepolymers using polyols outside the scope of the invention, as in Examples 9–11. Comparing Examples 2, 3 & 4 with Examples 1 & 5–7, it is seen that DETDA levels can be lowered substantially while maintaining properties acceptable for a commercial system. Example 4 shows that polyols with very low unsaturation (max unsaturation <0.007 meq/g) can be used for the present invention without the necessity of an ethylene oxide block in the polyether as required by the polyethers with unsaturations higher than 0.01 meq/g. The net result is a system with lower DETDA levels that can be used without the properties falling below acceptable levels.

|  | Example 1 | Example 2 | Example 3 | Example 4 | Example 5 | Example 6 |
|---|---|---|---|---|---|---|
| Chemical Name |  |  |  |  |  |  |
| Amine B | 48.5 | 48.5 | 48.5 | 48.5 | 54.5 | 59.5 |
| DETDA | 38.2 | 46 | 46 | 46 | 40 | 35 |
| Polyol H | 0.7 | 0.7 | 0.7 | 0.7 | 0.7 | 0.7 |
| Amine A | 2.9 | 2.9 | 2.9 | 2.9 | 2.9 | 2.9 |
| IMR A | 1.4 | 1.4 | 1.4 | 1.4 | 1.4 | 1.4 |
| B8418 | 0.5 | 0.5 | 0.5 | 0.5 | 0.5 | 0.5 |
| Prepolymer B | 113.8 | 133 |  |  |  |  |
| Prepolymer D |  |  | 133.8 |  |  |  |
| Prepolymer E |  |  |  | 133.2 |  |  |
| Prepolymer H |  |  |  |  | 145.5 | 131.4 |
| Filler | 36.4 | 46 | 41.3 | 41.1 | 58.3 | 55 |

-continued

|  | Example 1 | Example 2 | Example 3 | Example 4 | Example 5 | Example 6 |
|---|---|---|---|---|---|---|
| Physical Properties |  |  |  |  |  |  |
| 5 MPH Dart Impact Strength | 3.14 | 1.7 | 1.4 | 1.14 | 4.9 | 6.5 |
| Ultimate % Elongation | 14.6 | 9.5 | 10.3 | 11.5 | 42 | 52 |
| Flexural Modulus** | 181,125 | 210,240 | 246,295 | 236,722 | 272,200 | 228,000 |
| Heat Sag*** | 7.8 | 6.7 | 7.2 | 9.2 | 2.7 | 5.8 |
| Green Strength* | Good | Good | Good | Good | Good | Good |

*Green strength is an overall judgement determined by how hard it is to fold an 11.75" × 7.81" × 0.125" part in half and whether or not the part breaks when folded and how hard it is to remove the molding gate from the part
**Room Temperature @ 66 psi
***6" overhang @ 375° F. for 45 minutes

|  | Example 7 | Example 8 | Example 9 | Example 10 | Example 11 |
|---|---|---|---|---|---|
| Chemical Name |  |  |  |  |  |
| Amine B | 54.5 | 485 | 485 | 485 | 485 |
| DETDA | 40 | 46 | 38.2 | 38.2 | 46 |
| Polyol H | 0.7 | 0.7 | 0.7 | 0.7 | 0.7 |
| Amine A | 2.9 | 2.9 | 2.9 | 2.9 | 2.9 |
| IMR A | 1.4 | 1.4 | 1.4 | 1.4 | 1.4 |
| B8418 | 0.5 | 0.5 | 0.5 | 0.5 | 0.5 |
| Prepolymer A |  | 134.5 |  |  |  |
| Prepolymer G |  |  |  |  | 134.5 |
| Prepolymer F |  |  | 114 |  |  |
| Prepolymer C |  |  |  | 114 |  |
| Prepolymer I | 146.5 |  |  |  |  |
| Filler | 58.6 | 46.3 | 36.4 | 364 | 41.4 |
| Physical Properties |  |  |  |  |  |
| 5 MPH Dart Impact Strength | 6.4 | 1.72 | 1.18 | 1.52 | 0.9 |
| Ultimate % Elongation | 43 | 8.6 | 12.9 | 6.7 | 7.033 |
| Flexural Modulus** | 266,828 | 185,062 | 210,505 | 183,531 | 237,031 |
| Heat Sag*** | 4.7 | 8 | 6.7 | 14.7 | 7.333 |
| Green Strength* | Good | Good | Bad | Bad | Bad |

*Green strength is an overall judgement determined by how hard it is to fold an 11.75" × 7.81" × 0.125" part in half and whether or not the part breaks when folded and how hard it is to remove the molding gate from the part
**Room Temperature @ 66 psi; see ASTM Test Number in following table
***6" overhang @ 375° F. for 45 minutes; see ASTM Test Number in following table The following ASTM test methods were used in the working examples of the present application.

ASTM Tests

| Property | ASTM Test Number |
|---|---|
| 5 MPH Dart Impact Strength | D 3763 |
| Ultimate % Elongation | D 412 |
| Flexural Modulus | D 3489 (D 790 Method I) |
| Heat Sag | D 3769 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reaction injection molded poly(urethane)urea elastomer comprising the reaction product of:
   (A) an allophanate-modified diphenylmethane diisocyanate prepolymer having an NCO group content of about 5 to about 30%, and comprising the reaction product of:
   (1) an allophanate-modified diphenylmethane diisocyanate having an NCO group content of about 12 to about 32.5% and comprising the reaction product of:
      (a) an aliphatic alcohol or an aromatic alcohol; and
      (b) diphenylmethane diisocyanate comprising:
         (i) from about 0 to about 60% by weight of 2,4'-diphenylmethane diisocyanate;
         (ii) less than about 6% by weight of 2,2'-diphenylmethane diisocyanate; and
         (iii) the balance being 4,4'-diphenylmethane diisocyanate; wherein the sum of the %'s by weight of (i), (ii) and (iii) totals 100% by weight of (b); and
   (2) a polyether polyol having a molecular weight of about 1,000 to about 10,000, an OH number of about 337 to about 14, and a functionality of at least about 2.5, with the proviso that said polyether polyol is selected from the group consisting of:
(i) a KOH catalyzed polyether polyol containing at least about 5% by weight of ethylene oxide groups, based on 100% by weight of the alkylene oxide groups, and
(ii) a low unsaturation polyether polyol containing a maximum of 0.01 meq/g unsaturation;

with
(B) an isocyanate-reactive component comprising:
(1) from 35 to 80% by weight, based on 100% by weight of (B), of a high molecular weight amine-terminated polyciher polyol having a molecular weight of from greater than about 1,000 up to about 15,000 and a functionality of from about 2 to about 5;
(2) from 20 to 65% by weight, based on 100% by weight of (B), of an aromatic diamine chain extender having a molecular weight of about 100 to about 500; and
(3) from 0 to 5% by weight, based on 100% by weight of (B), of one or more chain extenders or crosslinkers having a molecular weight of 200 to 600 and a functionality of about 1.5 to about 6, selected from the group consisting of (a) aliphatic amine terminated polyether polyols and (b) aliphatic hydroxyl terminated polyether polyols;

optionally, in the presence of
(C) one or more internal mold release agents;
(D) one or more surfactants;
and/or
(E) one or more fillers;
at an Isocyanate Index of about 70 to about 130.

2. The reaction injection molded poly(urethane)urea elastomer of claim 1, wherein (A) said allophanate-modified diphenylmethane diisocyanate prepolymer has an NCO group content of about 13 to about 19% by weight, and comprises the reaction product of: (1) an allophanate-modified diphenylmethane diisocyanate having an NCO group content of about 26 to about 31% by weight; and (2) a polyether polyol having a molecular weight of about 2,000 to about 6,000, an OH number of about 169 to about 17 and a functionality of about 2.5 to about 6.

3. The elastomer of claim 2, wherein (A)(1) said allophanate-modified diphenylmethane diisocyanate comprises the reaction product of: (a) an aliphatic alcohol or an aromatic alcohol and (b) diphenylmethane disocyanate comprising (i) from about 1.5 to about 25% by weight of 2,4'-diphenylmethane diisocyanate, (ii) from about 0 to about 0.7% by weight of 2,2'-diphenylmethane diisocyanate, and (iii) the balance being 4,4'-diphenylmethane diisocyanate, wherein the sum of the %'s by weight of (1)(b)(i), (1)(b)(ii) and (1)(b)(iii) totals 100% by weight of (1)(b).

4. The elastomer of claim 1, wherein (A)(1)(a) said aliphatic alcohols contains from about 1 to about 36 carbon atoms and said aromatic alcohol contains from about 6 to about 18 carbon atoms.

5. The elastomer of claim 4, wherein (A)(1)(a) said aliphatic alcohol comprises isobutanol.

6. The elastomer of claim 1, wherein (A)(2) comprises a polyether polyol having a molecular weight of about 2,500 to about 6,000, an OH number of about 79 to about 23 and a functionality of about 2.5 to about 3.5.

7. The elastomer of claim 1, wherein (A)(2) said polyether polyol comprises:

(ii) a low unsaturation polyether polyol containing no more than 0.007 meq/g of unsaturation.

8. The elastomer of claim 1, wherein (A)(2) said polyether polyol comprises: (i) a KOH catalyzed polyether polyol containing from 10 to 30% by weight of ethylene oxide groups, based on 100% by weight of alkylene oxide groups present.

9. The elastomer of claim 1, wherein (B) said isocyanate-reactive component comprises: (1) from 45 to 70% by weight, based on 100% by weight of (B), of the high molecular weight amine terminated polyether polyol; (2) from 30 to 55% by weight, based on 100% by weight of (B), of the aromatic diamine chain extender; and (3) from 0 to 3% by weight, based on 100% by weight of (B), of one or more chain extenders or crosslinkers.

10. The elastomer of claim 1, wherein (B)(1) said high molecular weight amine terminated polyether polyol has a molecular weight of from greater than about 1,000 up to about 5,000 and contains from about 2 to about 4 amino groups.

11. The elastomer of claim 1, wherein (B)(2) said aromatic diamine chain extender comprises 1-methyl-3,5-diethyl-2,4-diaminobenzene, 1-methyl,3,5-diethyl-2,6-diaminobenzene, or a mixture thereof.

12. The elastomer of claim 1, wherein (B)(3) said chain extenders and/or crosslinkers have molecular weights of from 250 to 600 and functionalities of about 1.5 to about 5.5.

13. The elastomer of claim 1, wherein the reaction of (A) said allophanate-modified diphenylmethane diisocyanate prepolymer, with (B) said isocyanate-reactive component, occurs in the presence of (F) water.

14. A process for producing a reaction injection molded poly(urethane)urea elastomer comprising:
(1) reacting a reaction mixture comprising:
(A) an allophanate-modified diphenylmethane diisocyanate prepolymer having an NCO group content of about 5 to about 30%, and comprising the reaction product of:
(1) an allophanate-modified diphenylmethane diisocyanate having an NCO group content of about 12 to about 32.5% and comprising the reaction product of:
(a) an aliphatic alcohol or an aromatic alcohol; and
(b) diphenylmethane diisocyanate comprising:
(i) from about 0 to about 60% by weight of 2,4'-diphenylmethane diisocyanate;
(ii) less than about 6% by weight of 2,2'-diphenylmethane diisocyanate; and
(iii) the balance being 4,4'-diphenylmethane diisocyanate; wherein the sum of the %'s by weight of (i), (ii) and (iii) totals 100% by weight of (b); and
(2) a polyether polyol having a molecular weight of about 1,000 to about 10,000, an OH number of about 337 to about 14, and a functionality of at least about 2.5, with the proviso that said polyether polyol is selected from the group consisting of:
(i) a KOH catalyzed polyether polyol containing at least about 5% by weight of ethylene oxide groups, based on 100% by weight of the alkylene oxide groups, and
(ii) a low unsaturation polyether polyol containing a maximum of 0.01 meq/g unsaturation; with
(B) an isocyanate-reactive component comprising:
(1) from 35 to 80% by weight, based on 100% by weight of (B), of a high molecular weight amine-terminated polyether polyol having a molecular weight of from greater than about 1,000 up to about 15,000 and a functionality of from about 2 to about 5;

(2) from 20 to 65% by weight, based on 100% by weight of (B), of an aromatic diamine chain extender having a molecular weight of about 100 to about 500; and (3) from 0 to 5% by weight, based on 100% by weight of (B), of one or more chain extenders or crosslinkers having a molecular weight of 200 to 600, and a functionality of about 1.5 to about 6, selected from the group consisting of (a) aliphatic amine terminated polyether polyols and (b) aliphatic hydroxyl terminated polyether polyols;

optionally, in the presence of (C) one or more internal mold release agents;

(D) one or more surfactants; and/or (E) one or more fillers;

at an Isocyanate Index of about 70 to about 130.

15. The process of claim 14, wherein (A) said allophanate-modified diphenylmethane diisocyanate prepolymer has an NCO group content of about 13 to about 19% by weight, and comprises the reaction product of: (1) an allophanate-modified diphenylmethane diisocyanate having an NCO group content of about 26 to about 31% by weight; and (2) a polyether polyol having a molecular weight of about 2,000 to about 6,000, an OH number of about 169 to about 17 and a functionality of about 2.5 to about 6.

16. The process of claim 15, wherein (A)(1) said allophanate-modified diphenylmethane diisocyanate comprises the reaction product of: (a) an aliphatic alcohol or an aromatic alcohol and (b) diphenylmethane disocyanate comprising (i) from about 1.5 to about 25% by weight of 2,4'-diphenylmethane diisocyanate, (ii) from about 0 to about 0.7% by weight of 2,2'-diphenylmethane diisocyanate, and (iii) the balance being 4,4'-diphenylmethane diisocyanate, wherein the sum of the %'s by weight of (1)(b)(i), (1)(b)(ii) and (1)(b)(iii) totals 100% by weight of (1)(b).

17. The process of claim 14, wherein (A)(1)(a) said aliphatic alcohols contains from about 1 to about 36 carbon atoms and said aromatic alcohol contains from about 6 to about 18 carbon atoms.

18. The process of claim 17, wherein (A)(1)(a) said aliphatic alcohol comprises isobutanol.

19. The process of claim 14, wherein (A)(2) comprises a polyether polyol having a molecular weight of about 2,500 to about 6,000, an OH number of about 79 to about 23 and a functionality of about 2.5 to about 3.5.

20. The process of claim 14, wherein (A)(2) said polyether polyol comprises: (ii) a low unsaturation polyether polyol containing no more than 0.007 meq/g of unsaturation.

21. The process of claim 14, wherein (A)(2) said polyether polyol comprises: (i) a KOH catalyzed polyether polyol containing from 10 to 30% by weight of ethylene oxide groups, based on 100% by weight of alkylene oxide groups present.

22. The process of claim 14, wherein (B) said isocyanate-reactive component comprises: (1) from 45 to 70% by weight, based on 100% by weight of (B), of the high molecular weight amine terminated polyether polyol; (2) from 30 to 55% by weight, based on 100% by weight of (B), of the aromatic diamine chain extender; and (3) from 0 to 3% by weight, based on 100% by weight of (B), of one or more chain extenders or crosslinkers.

23. The process of claim 14, wherein (B)(1) said high molecular weight amine terminated polyether polyol has a molecular weight of from greater than about 1,000 up to about 5,000 and contains from about 2 to about 4 amino groups.

24. The process of claim 14, wherein (B)(2) said aromatic diamine chain extender comprises 1-methyl-3,5-diethyl-2,4-diaminobenzene, 1-methyl,3,5-diethyl-2,6-diaminobenzene, or a mixture thereof.

25. The process of claim 14, wherein (B)(3) said chain extenders and/or crosslinkers have molecular weights of from 250 to 600 and functionalities of about 1.5 to about 5.5.

26. The process of claim 14, wherein the reaction of (A) said allophanate-modified diphenylmethane diisocyanate prepolymer, with (B) said isocyanate-reactive component, occurs in the presence of (F) water.

* * * * *